Jan. 17, 1967   K. W. ADAMS   3,298,312
HIGH PRESSURE NOSE FOR A BODY IN FLIGHT
Filed June 14, 1965
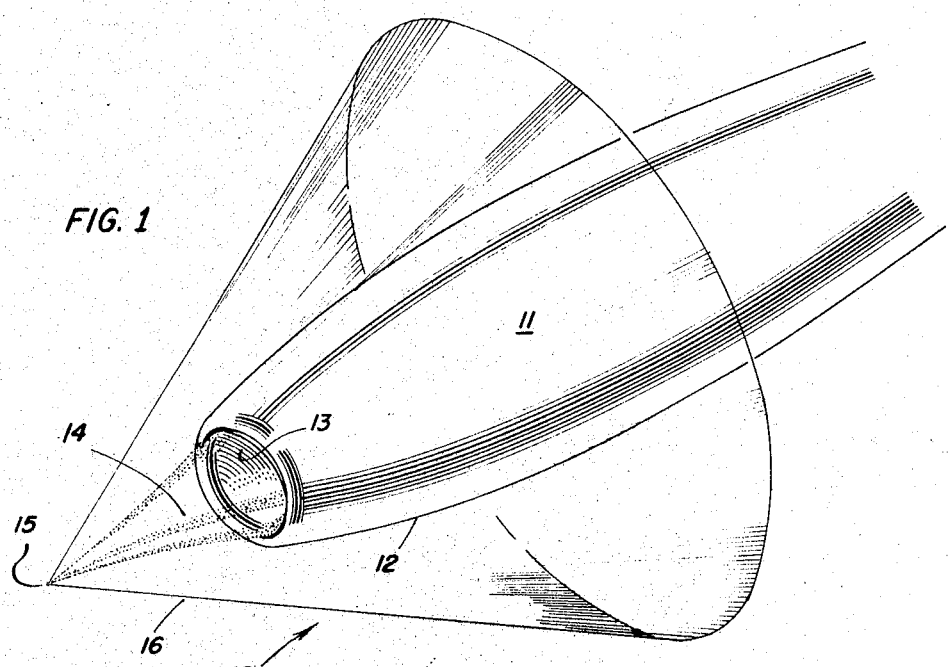
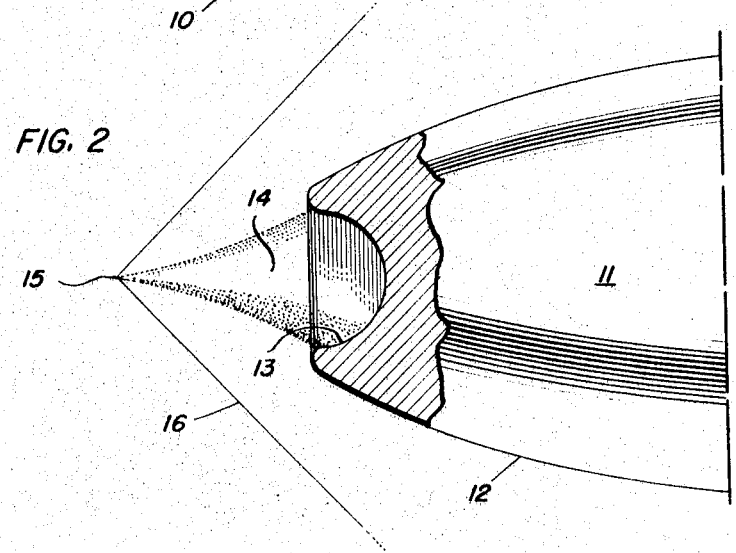
INVENTOR
KENNETH W. ADAMS
BY Claude Funkhouser
ATTORNEY

3,298,312
HIGH PRESSURE NOSE FOR A BODY IN FLIGHT
Kenneth W. Adams, Sunnyvale, Calif., assignor, by mesne assignments, to the United States of America as represented by the Secretary of the Navy
Filed June 14, 1965, Ser. No. 463,972
2 Claims. (Cl. 102—92.5)

This invention relates generally to bodies in flight and more particularly to the design of the nose of said bodies.

When a body in flight, such as an aircraft, missile, or re-entry vehicle travels through the Earth's atmosphere at speeds in excess of the speed of sound, the impact or friction between the body and the molecules of air through which it is moving heat its skin. Unless measures are taken to cool the skin of the body, there is a definite limitation on its speed, since under exceedingly high temperatures the structure could fail due to the heat melting the metal of the skin. For example, when an aluminum skinned aircraft reaches a temperature above 400° F., the structural strength of the aluminum is seriously impaired and the parts of the skin which are under stress could very possibly fail unless they have been designed to provide a considerable margin of safety. Titanium retains most of its structural strength up to 900° F., for a short time, and some special steels can safely take up to 1200° F. for short periods of time. However, above such temperatures these materials must be cooled in order to prevent serious impairment of their structural strength, or the structure must be considerably heavier than would be normally required in order to provide a margin of safety.

Heretofore, various devices, including more or less conventional mechanical refrigerating plants, boundary layer control and emission of fluids to form a protective film over the skin, have been employed for cooling the skin of supersonic bodies. These prior cooling devices not only have been very inefficient but they have been complicated and expensive, and have added substantially to the gross weight of the vehicle. Also, since it is necessary to have power to operate these devices, they have derived their power from the main power plant of the vehicle, thus substantially reducing the net power available for propulsion.

By the present invention, the design of the nose of the body in flight is such that a high pressure zone is built up forward of the nose. This high pressure zone moves the stagnation point and the leading edge shock wave off the body, thereby reducing aerodynamic heating, reducing the effect of the shock wave on the body, and reducing drag. Thus, this invention has important application in aircraft, missiles, rockets and space flight re-entry vehicles.

It is an object of the present invention to provide a means for cooling the skin of a body in flight.

It is a further object of the present invention to provide a means for cooling the skin of a body in flight which is simple, inexpensive, and efficient, and which does not greatly increase the weight of the body, place any load on its power plant, or interfere with its aerodynamic characteristics.

A further object of the present invention is to provide a nose of such design as will move the stagnation point and shock wave off the flying body.

Other objects, advantages and novel features of the present invention will become apparent from the following detailed description of the invention when considered in conjunction with the accompanying drawings wherein:

FIG. 1 is an isometric view of the nose of a body incorporating the present invention; and FIG. 2 is a fragmentary elevational view of the apparatus shown in FIG. 1.

As illustrated in the drawings, the high pressure nose design of the invention generally indicated as 10, is constructed in the forward most part of the nose of the body in flight 11, this body having a skin 12. A hemispherical indentation 13 is formulated in the nose 11 and as the body moves through the more dense portions of the atmosphere a high pressure zone 14 is created forward of indentation 13. This high pressure zone 14 is of approximately conical shape and terminates at a stagnation point 15 which presents a leading edge of a magnitude of a single molecule. This leading edge stagnation point 15, being off the surface of the nose of the body, substantially reduces aerodynamic heating since it changes the flow characteristics of the air about the skin 12 and also moves the shock wave off the body, thereby reducing its effect. Experiments have further shown that by using the nose configuration of the present invention the aerodynamic drag is reduced.

The invention is made to operate by the simple movement of the aircraft through the earth's atmosphere. This movement causes a pressure buildup in the hollow point 13 in the nose 11 and thus the high pressure area 14 is built up and extends out to a point at 15. This point holds the shock wave 16 off the body and thus reduces aerodynamic friction. The configuration of this hollow point 13 may be altered within the concept of this invention in order to provide the exact high pressure area shape desired within the limits of maintaining a single molecule point at leading edge 15.

Obviously many modifications and variations of the present invention are possible in the light of the above teachings. It is therefore to be understood that within the scope of the appended claims the invention may be practiced otherwise than as specifically described.

What is claimed is:

1. A supersonic body in flight, such as a re-entry vehicle and the like, capable of moving through dense portions of the atmosphere at speeds in excess of the speed of sound without its skin heating above a temperature of approximately 400° F., the important comprising a body of revolution having a substantially flat leading edge perpendicular to the longitudinal axis of said body of revolution, an indentation means of predetermined shape formed within said flat surface centrally aligned about said longitudinal axis, said means functioning to create a high pressure zone within and forward of said indentation and substantially as a forward extension of said skin at said leading edge to a point of a single molecule, said point defining the stagnation point of said body at which air flow divides to go on either side of said body, thereby reducing aerodynamic heating and at which the shock wave leading edge commences, thereby reducing the effect of said shock wave on said body.

2. The supersonic body in flight according to claim 1 wherein said indentation means is in the shape of a hemisphere.

References Cited by the Examiner

UNITED STATES PATENTS

| | | | |
|---|---|---|---|
| 1,122,738 | 12/1914 | Gully | 102—92.5 |
| 1,198,056 | 9/1916 | Richardson | 102—52 |
| 2,939,276 | 6/1960 | Wise | 60—35.6 |
| 3,086,357 | 4/1963 | Rubin et al. | 60—35.6 |

FOREIGN PATENTS

| | | |
|---|---|---|
| 66,960 | 4/1914 | Austria. |
| 124,669 | 10/1901 | Germany. |
| 734,429 | 4/1943 | Germany. |
| 953,557 | 3/1964 | Great Britain. |

BENJAMIN A. BORCHELT, *Primary Examiner.*

ROBERT F. STAHL, *Examiner.*

SAMUEL W. ENGLE, *Assistant Examiner.*